United States Patent [19]
Eddens

[11] 3,962,595
[45] June 8, 1976

[54] MAGNETIC PARTICLE BRAKE
[75] Inventor: Gerald R. Eddens, St. Louis County, Mo.
[73] Assignee: W. J. Industries, Incorporated, St. Louis, Mo.
[22] Filed: Dec. 20, 1974
[21] Appl. No.: 534,716

[52] U.S. Cl. .............................. 310/93; 188/159; 188/164; 310/103; 310/105
[51] Int. Cl.² ........................................ H02K 49/00
[58] Field of Search .............. 310/92, 93, 103, 105; 188/158, 159, 161, 162, 164

[56] References Cited
UNITED STATES PATENTS

| | | |
|---|---|---|
| 2,752,800 | 7/1956 | Raymond et al. ............... 310/92 X |
| 2,791,308 | 5/1957 | Barrett et al. .................... 310/93 X |
| 3,076,109 | 1/1963 | Cohen et al. ..................... 310/105 |
| 3,103,605 | 9/1963 | Russell ............................. 310/105 |
| 3,216,542 | 11/1965 | Comstock ....................... 310/92 X |
| 3,238,402 | 3/1966 | Fehn ................................ 310/105 |
| 3,262,534 | 7/1966 | Monroe et al. ................. 310/105 X |
| 3,332,145 | 7/1967 | Klinkenberg ................... 310/103 X |
| 3,394,278 | 7/1968 | Schetinin ........................ 310/92 X |
| 3,609,418 | 9/1971 | Halas .............................. 310/93 X |

Primary Examiner—Mark O. Budd
Attorney, Agent, or Firm—Charles B. Haverstock

[57] ABSTRACT

A magnetic particle device such as a magnetic particle brake in which the flux producing means are mounted in a stationary member, said device having improved means for dissipating heat, improved means for locating the heat sensitive members including the bearing members relatively remote from the region where most of the heat is generated, the rotatable portions of the subject devices being mounted between stationary portions thereof, and means forming an improved magnetic gap construction for such devices. The device may also include improved means for circulating a liquid coolant from an external source through stationary portions of the device and simplified relatively trouble free means for making the electrical connections to the flux producing means.

17 Claims, 6 Drawing Figures

MAGNETIC PARTICLE BRAKE

Many magnetic particle devices including magnetic particle brakes have been devised and used heretofore and they have established the principles of providing magnetic coupling between relatively movable members by establishing an electric field across a gap between relatively movable members in which magnetizable particles or powders are located. Such devices have enjoyed wide usage in certain types of applications especially where infinitely variable control of the coupling and smooth torque control independent of speed or slip conditions is required. Variation in the torque is obtained by varying the current applied through a coil used to establish the magnetic coupling. Magnetic particle devices have been especially successful in applications where the torque required is independent of speed, and where the control is simple and easy to vary.

All of the known magnetic particle brakes have had certain shortcomings and disadvantages which have limited their usefulness and made them unsuitable for many applications. Among the main disadvantages of the most known magnetic particle brakes is their inability to be able to sufficiently rapidly dissipate the heat generated in them, and because of this they overheat and prematurely burn out or malfunction. Furthermore, the known brakes for the most part have required slip rings, brushes and other like devices to connect their coils to a source of energizing current and such devices wear out and require frequent maintenance. They also cause other kinds of problems such as arcing problems.

The bearings used in known devices have also been located where they are exposed to relatively high heat conditions in the devices and this causes them to overheat and wear out prematurely. Still further, no known magnetic particle brake includes means for circulating air and/or a liquid coolant around and adjacent to the high heat producing regions to rapidly dissipate the heat generated and minimize undesirable temperature build up, and no known magnetic particle brake includes means for circulating a liquid coolant such as water through stationary as distinguished from movable portions thereof to further reduce the chance for overheating while at the same time eliminating the need for special seals and other means to prevent leakage. It is also significant that no known magnetic particle brake exists which is as simple structurally as the present device and which can be made to be as relatively compact and trouble free. These and other limitations and shortcomings of prior constructions have substantially limited their usefulness and has made them unsuitable for many applications as aforesaid including applications wherein physical size and space are limited.

Typical applications where the subject magnetic particle brakes can be used to advantage include applications where the controls must be simple, where space is limited and where cost is an important factor and situations where wide variation in coupling is needed. These include uses in devices and systems such as systems for controlling the tension when winding and unwinding materials such as in printing press applications where paper pressures and tensions are critical, in textile machinery applications, in paper and film converting devices including devices for winding and unwinding films, in plastic extrusion applications particularly where the plastic material being extruded is wound on a spool or is unwound, in wire drawing and wire taping machines, in material handling applications including uses on conveyors, caseloaders and pallatizers, in various machine tool applications where tensions and pressures are important, and uses in dynamometers and other like devices for various purposes. In other words, magnetic particle brakes have many possible applications and can be used wherever a continuous slip or tension control condition is required, wherever it is required to provide relatively soft stops and starts and smooth acceleration and deceleration conditions, and where overload protection is needed to prevent equipment jams and other malfunctions. The above examples of uses are only a few of the many possible places where magnetic particle brakes can be used.

It is therefore a major object of the present invention to teach the construction and operation of improved high heat dissipation magnetic particle brakes.

Another object is to simplify the construction and reduce the cost of magnetic particle brakes.

Another object is to teach the construction of magnetic particle brakes wherein the heat sensitive members such as the bearing and the like are located relatively remote from the areas where most of the heat is produced.

Another object is to provide high heat dissipation magnetic particle brakes with improved means for circulating a liquid coolant therethrough.

Another object is to simplify and reduce the cost of means used for circulating a liquid coolant in magnetic particle brakes.

Another object is to simplify the construction of the electrical connections to the flux producing means used on magnetic particle brakes and to make them more trouble free.

Another object is to locate at least part of the rotatable portions of magnetic particle brakes between stationary members.

Another object is to provide improved means for circulating air around the heat producing parts of magnetic particle brakes in a manner to efficiently dissipate the heat that is generated.

Another object is to increase the mounting versatility of magnetic particle brakes.

Another object is to minimize the possibility of leakage of coolant used to dissipate heat in magnetic particle devices.

These and other objects and advantages of the present invention will become apparent after considering the following detailed specification which covers several preferred embodiments thereof in conjunction with the accompanying drawings, wherein.

Figure 1:
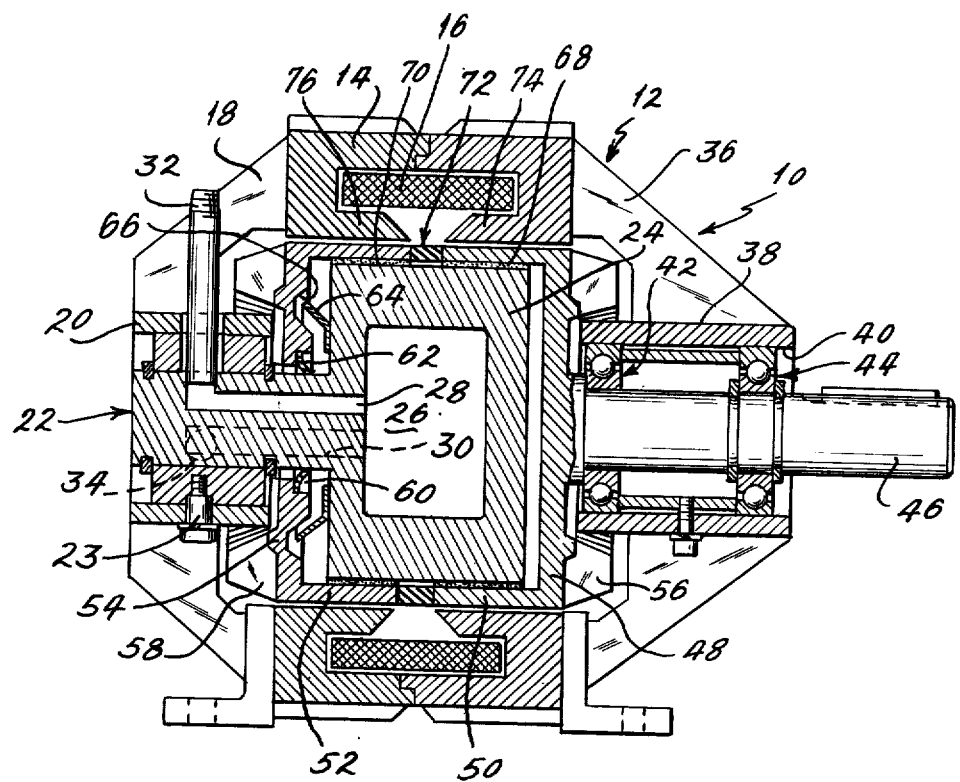
FIG. 1 is a cross-sectional view through a magnetic particle brake constructed according to the present invention.

Referring to the drawings more particularly by reference numbers, number 10 in FIG. 1 refers to a magnetic particle device, particularly a magnetic particle brake device, which incorporates many of the features of the present invention. The device of FIG. 1 includes a stationary outer portion indicated generally by 12 which includes a coil housing portion 14 in which a magnetic coil 16 is located. The coil housing 14 may be considered part of the stator or stationary portion of the device and is connected at one end by a plurality of rigid members or struts 18 to an annular member 20. The member 20 is also rigidly connected to a non-rotatable inner member 22 which is shown as the center portion of the device 10. The member 22 is locked against movement by member 23 and includes a hollow center portion 24 with a cavity 26 formed therein, and as will be explained, the cavity 26 is for receiving a coolant which is circulated therethrough during operation and used for cooling and carrying away some of the heat that is generated in the device.

The cavity 26 communicates with a pair of axially extending passages 28 and 30. The opposite end of the passage 28 communicates with a radially extending tube 32 which is threaded therein and the passage 30 is likewise connected to a radially extending tube 34. The opposite ends of the tubes 32 and 34 are connected to the inlet and outlet of a coolant circulating system, not shown. The tubes 32 and 34 can be flexible tubes if desired. The coolant system itself may be of a known construction including having a reservoir of coolant and pump means for circulating it. The important thing is that all parts of the coolant system which are connected to the subject device are connected to stationary members, and this is an advantage because it eliminates the need for complicated seals and other members which otherwise would be required. During operation of the device 10 a coolant is continuously circulated through the cavity 26 by way of the passages 28 and 30 and the associated tubular members 32 and 34, respectively, and the coolant may also circulate through some form of heat exchanger such as a radiator or the like. These features are especially easy to install on magnetic particle brakes because the member 22 remains stationary at all times. This makes for a relatively simple construction and one that is unlikely to leak because no movable seal means are required.

The opposite side of the coil housing 14 from the annular member 20 is connected by a plurality of other fixed strut members 36 which are connected at their opposite ends to another stationary annular member 38. The member 38 has a cylindrical inner surface 40 which is made to accommodate the outer races of a pair of spaced bearing assemblies 42 and 44. The inner races of the bearing assemblies 42 and 44 are mounted on a rotatable shaft 46 which is the operating shaft for the subject device. The operating shaft 46 is fixedly connected to the rotating portions of the subject brake device, which rotating portions include connected portions 48, 50, 52 and 54. The portions 48 and 54 are end walls of the rotating structure and the portions 50 and 52 extend between the inner surfaces of the stationary coil housing 14 and the enlarged portion 24 of the inner stationary member 22.

The rotating end wall 48 has a plurality of spaced endwardly extending fins 56 which are located so that when the device is operating the fins 56 will circulate air around the adjacent end of the subject device including around and adjacent to the high heat producing areas and around the bearing assemblies 42 and 44. The opposite end of the rotating structure including the rotating end wall 54 also has a plurality of similar but oppositely endwardly extending fins 58 which circulate air around and adjacent to the opposite end of the high heat producing regions when the device is operating. The fins 56 and 58 and the coolant system described above are important because devices such as the present device usually generate considerable amounts of heat especially when operating with controlled drag, and it is important to be able to efficiently and rapidly dissipate this heat so that it does not cause damage. The fact that the rotating member has good thermal conductivity between all portions thereof also enables it to equalize the heat generated therein, and this fact coupled with the fact that it is the movable member and has the fin means to circulate air around it all contribute to its effectiveness as a heat dissipator. The combined action of the cooling means described are able to accomplish this although it is contemplated that the separate heat dissipation means described, namely the fins and the liquid coolant means, can be used separately in cases where the heat generated may not require both.

The rotating end wall 54 (FIG. 1) has an annular groove 60 located adjacent to its inner surface and this groove receives an annular seal 62 which makes sliding and sealing engagement between the wall 54 and the outer surface of the stationary member 22. The enlarged hollow portion 24 of the member 22 has attached to its end surface an annular baffle 64 which extends sidewardly therefrom and partway into an annular groove 66 formed in the side of the rotating wall member 54. The purpose of the baffle 64 and the groove 66 is to confine the magnetic particles or powder used to form the coupling between the stationary and the rotating members in the subject device and to prevent the particles from escaping when the device is deenergized.

The magnetic particles or powder are shown in FIG. 1 arranged as when the device is operating by being in two annular bands 68 and 70 in the space between the stationary member 24 and the rotating members 50 and 52, respectively. The particle bands 68 and 70 are located on opposite sides of non-magnetic gap forming means 72 which are positioned between the magnetic members 50 and 52. The details of various embodiments of the gap forming means 72 will be described in connection with FIGS. 3–6. It is also to be noted that the inner portion of the coil housing 14 is defined by spaced annular portions 74 and 76.

During operation of the subject magnetic particle brake, and shaft 46 is coupled to the means to be braked such as by direct coupling means or by belt or other such coupling means. Braking pressure is applied to the member 46 and to the member to be braked by the current in the coil 16. If the current that flows through the coil 16 is increased the magnetic coupling between the stationary members 74, 76 and 24 and the rotating members 48, 50, 52 and 54 will increase. The increased current will increase the flux in the magnetic circuit and a large part of this flux will extend through the spaces formed by and between the stationary portions 74, 76 and 24 and the rotating members 50 and 52. The flux established across these spaces causes the magnetic particles in the bands 68 and 70 to produce a coupling force between the stationary and the rotatable members and this coupling force can be increased or decreased by increasing or decreasing the current flow in the coil 16. As the coupling force is increased it increases the braking action of the shaft 46 and on the members connected thereto. If the coupling force is increased sufficiently the shaft 46 may actually stop. On the other hand, if the current is reduced the coupling will be reduced and at or near zero current little or no braking action will occur. The braking force can therefore be adjusted to any amount between these limits, and depending on the amount of coupling or braking action required and the frequency or consistency of its application determines the amount of heat generated in the device. This can be and often is a substantial amount of heat. In many applications especially those where a continuous drag is required substantial heat will be produced and it is therefore important, if not essential, to be able to dissipate this heat as rapidly as possible to prevent excessive temperature build-up and premature breakdown. The present construction has extremely high heat dissipation characteristics. There are also known sensing devices that can be used to sense some condition such as tension or roll size and to produce an output to control the current flow and hence the braking action. Such devices are not part of the present invention as such.

The spacing of the leg portions 74 and 76 on the coil housing 14 causes the magnetic flux produced in the housing 14 by the coil 16 to be diverted so that it passes through the rotating members 50 and 52 and around the non-magnetic gap 72 formed therebetween and into the stationary magnetic member 24. If there were no gap 72 or other flux interrupting means between the members 50 and 52 the magnetic field would be short circuited and pass directly between the members 50 and 52, and relatively little, if any, flux would pass into the member 24. This would be very unsatisfactory. For this reason the gap 72 is necessary, and it is also important that the construction of the gap be such as to produce certain desired characteristics as will be explained. For one thing, it is important that a substantial portion of the total flux that is generated be coupled into the member 24 in order for the device to be efficient and to produce sufficient braking action.

The gap 72 can be formed in many different ways. If the gap is formed by placing a non-magnetic member such as brass filler member 80 in FIG. 3 between members 50' and 52' a substantial portion of the flux will be diverted and forced to move into the member 24 through the bands of magnetic particles. This is an effective way to cause a large part of the flux to couple the movable and non-movable members, but this construction of the gap also has limitations. The main shortcoming of this construction is that substantial residual torque remains after the current in the coil 16 is reduced or cut off. This is due mainly to the fact that the permanent residual flux that is established is relatively high. Hence while the construction of FIG. 3 has some features to recommend it including the fact that it is an efficient torque producer, it also has the limitation mentioned above. The flux path established using this construction is illustrated by the arrows in FIG. 3.

Figure 4:
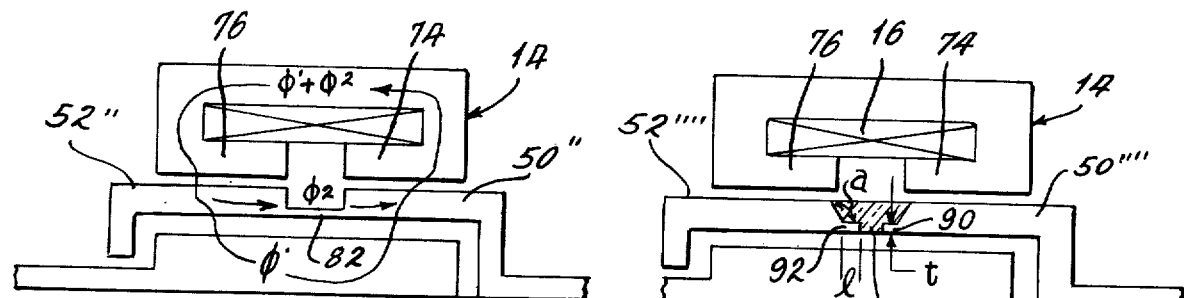

FIG. 4 shows another construction wherein no actual gap is formed between the members 50'' and 52'' but where instead the members 50'' and 52'' are connected by a narrow integral magnetic portion on band 82. The narrow band 82 acts as a high reluctance path to the flux and saturates at a fairly low flux level. As a result most, but not all, of the flux, is diverted through a path which includes the particle bands 68 and 70 and the member 24. This construction acts somewhat like a saturable bridge wherein some of the flux leaks through the narrow portion 82 causing it to saturate. In this construction the coil 16 must be able to generate an excess of the flux necessary to produce the desired braking or coupling action. Because of this the gap construction shown in FIG. 4 is somewhat less efficient than the construction shown in FIG. 3, and the coil 16 has to produce more flux than is necessary to produce the desired torque or braking action. The construction of FIG. 4 has a relatively low residual flux level compared to the construction of FIG. 3 and to this extent has an advantage over more efficient constructions such as that shown in FIG. 3. This is so because in the FIG. 4 construction the residual flux is shunted across the gap. The narrow portion 82 in FIG. 4 can be made by forming a groove in the connected members 50'' and 52''. This groove can remain as a groove or it can be filled with a filler material such as brass which is non-magnetic. If a filler is used it will strengthen the construction and may also improve its thermal conductivity characteristics.

Figure 5:
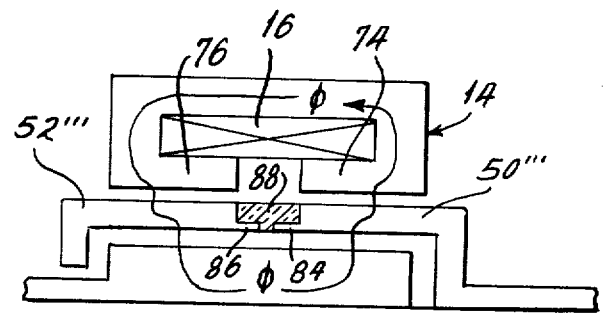
Figure 6:
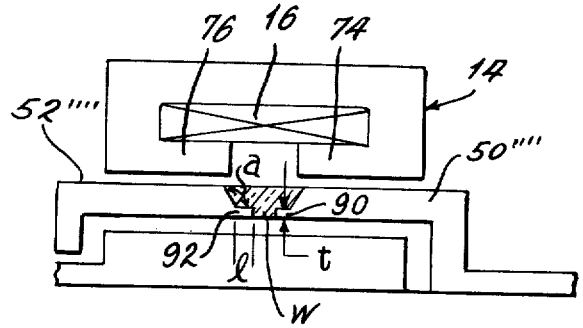

Other non-magnetic gap constructions for the gap 72 are shown in FIGS. 5 and 6. These constructions involve similar principles and have been found to produce even better operating characteristics for some applications. The construction shown in FIG. 5 has magnetic members 50''' and 52''' constructed to respectively include spaced narrow annular portions or flanges 84 and 86, and the space between the members 50''' and 52''' and between the flange portions 84 and 86 is filled with a non-magnetic filler material such as brass filler 88. This construction represents a compromise between the constructions shown in FIGS. 3 and 4 and results in reduced residual flux as compared to the FIG. 3 construction and reduced resulting drag as compared to the construction in FIG. 4. The shape of the flux paths in FIG. 5 is such that the main portion extends through the magnetic particles and through the member 24 with only a relatively small portion of the flux extending more directly between the narrow portions 84 and 86 and around the narrower non-magnetic filler 88 therebetween. In this construction as in the FIG. 3 construction there is no actual connection between the members 50''' and 52''' and therefore no flux is directly shunted between these members. Therefore substantially all of the flux produced in this construction is effective and available to produce torque. Furthermore, when the coil 16 is deenergized in this construction or the current is reduced any residual flux that is present will be limited to the relatively small amount that extends between the spaced opposed faces of the narrow annular portions 84 and 86, and since this flux is minimal the resulting residual drag is also minimal. This is a desired condition for most applications especially for braking or dragging applications and for constructions where smooth acceleration and deceleration is a requirement.

FIG. 6 shows another gap embodiment formed by and between the members 50'''' and 52''''. The gap in FIG. 6 is similar to that shown in FIG. 5 but the shape of the members has been modified to further improve the operating characteristics for some applications. The gap of FIG. 6 differs from the gap of FIG. 5 by having the opposed surfaces of the members 50'''' and 52'''' arranged to be at an angle relative to each other to further increase the efficiency and to reduce the flux leakage. Various dimensions associated with the construction of FIG. 6 are indicated on the drawing and all of these dimensions can be varied to change the operating characteristics. For example, as the thickness (t) of the narrow portions 90 and 92 is decreased less flux leakage will occur and hence the magnetic circuit will become more efficient than is the case with a saturable member as shown in FIG. 4. The spacing (w) between the narrow magnetic portions 90 and 92 serves to isolate the members 50'''' and 52'''' from each other and also prevents a direct magnetic short circuit therebetween. The angle (a), which is the angle between the respective opposed surfaces of the members 50'''' and 52-'' and their adjacent side surfaces can be varied. If these angles are increased the circuit becomes more efficient because the leakage flux is reduced. The length (l) of the narrow portions 90 and 92 is also a variable and is an important parameter. As this length increases the magnetic circuit tends to become more efficient in the gap area, but if this dimension is increased too much other compensating dimensional changes will be required including increases in the length of the other components such as the length of the members 50'''' and 52''''. Thus the construction and dimensional characteristics of the non-magnetic gap are important to the operation and for any particular application represent a compromise between various considerations. It is usually preferred, however, to provide a connecting filler material of brass or some other suitable relatively non-magnetic material between the spaced magnetic portions of the rotating members because such a connection not only improves the thermal characteristics of the member but it also provides a good mechanical connection therebetween.

The fact that in the subject brake construction the bearing members, which are the most heat sensitive members, are located relatively remote from the regions where most of the heat is produced is a significant advantage. It is also an important advantage structurally and operationally to have the coil mounted in a stationary member.

Figure 2:
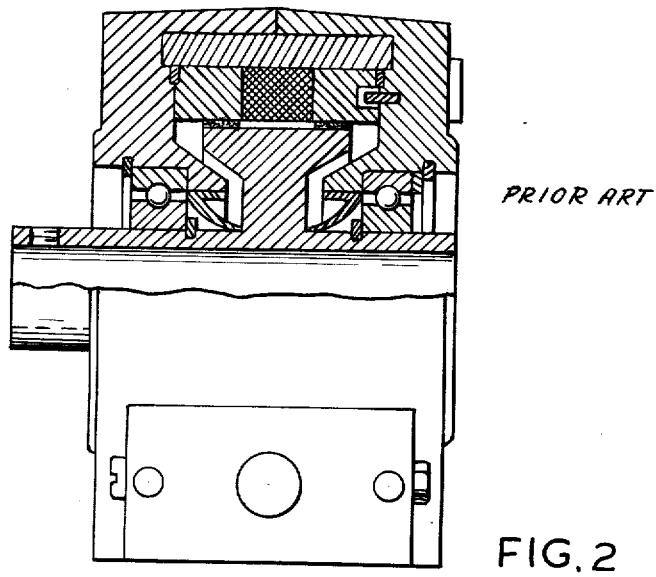
FIG. 2 is a cross-sectional view of a more or less conventional magnetic particle brake construction.
Figure 3:
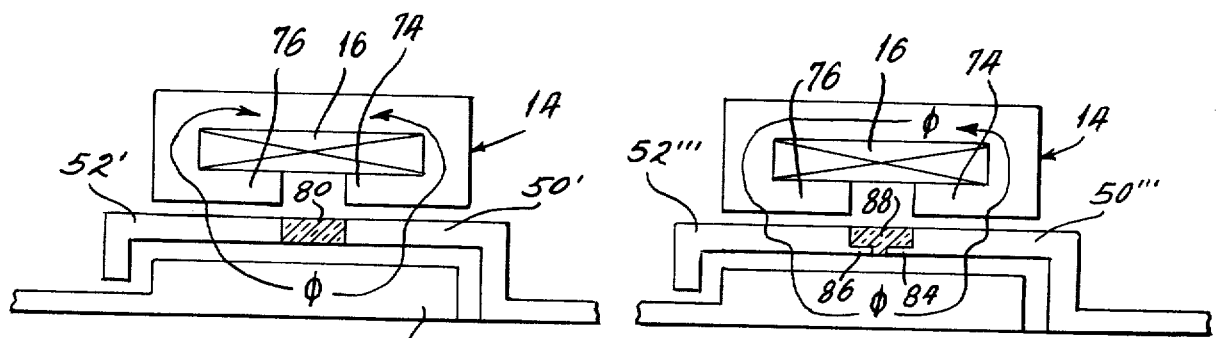
FIG. 3 shows one form of a gap construction using non-magnetic spacer means to modify the location of a magnetic flux path generated in a brake device; and, FIGS. 4–6 show other forms of gap constructions.

While it is recognized that magnetic particle devices have been constructed and used in the past, the present brake construction has certain important advantages over the known constructions as already indicated. In order to further emphasize some of the more important differences between the present construction and the known devices, a more or less conventional magnetic particle device is shown in FIG. 2. In the conventional construction the close proximity between the bearing members and the heat producing areas is clearly evident. Note also the absence in the prior art device of any means to circulate either a liquid coolant and/or air around or adjacent to the high producing regions. Also no known magnetic particle brake device has a rotatable member similar to that shown herein wherein the gap forming portions are positioned for movement between stationary members located on opposite sides thereof including between magnetic portions of the stationary coil housing and an inner stationary member. Furthermore, no known brake construction has gap means similar to the various forms of gap means shown for use in the present device, which gap means can be constructed to provide particular operating characteristics by the selection of different physical parameters. For these and other reasons the known devices have enjoyed limited usefulness, have not had optimum efficiency, have produced residual magnetic conditions which adversely affect their operation, have overheated, and have not been satisfactory for many applications. The known devices also cause relatively frequent repair and maintenance problems and have been too unreliable and trouble prone for many applications.

Thus there has been shown and described a magnetic particle brake device which fulfills all of the objects and advantages therefor. It will be apparent to those skilled in the art, however, that many changes, modifications, variations and other uses and applications of the subject device are possible and could be made. All such changes, modifications, variations and other uses and applications which do not depart from the spirit and scope of the invention are deemed to be covered by the invention which is limited only by the claims which follow.

What is claimed is:

1. A magnetic particle brake device comprising a stationary member including a housing portion constructed of magnetic material, said housing having an annular cavity defined in part by spaced annular inner housing portions, a coil mounted in said housing cavity, means connecting said coil to a source of electric energy, a movable member mounted in said stationary member, said movable member including a pair of spaced annular magnetic portions connected together by non-magnetic connecting means to define a flux gap therebetween, the portions of said spaced pair being located closely adjacent to respective ones of the spaced annular inner housing portions, another stationary magnetic member positioned on the opposite side of said pair of spaced movable portions from the spaced housing portions and including a portion with a smooth annular surface that extends across and closely adjacent to said spaced movable portions and to the non-magnetic connecting means therebetween so that a magnetic flux path produced when the coil is energized extends from the spaced housing portions through the respective spaced portions of the movable member and through the other stationary magnetic member, and particles of a magnetizeable substance positioned in the space between the movable member and said other stationary member, said particles forming parts of the flux path produced when the coil is energized.

2. The magnetic particle device defined in claim 1 wherein said other stationary magnetic member has a chamber formed therein, and means for circulating a liquid coolant through said chamber, said liquid circulating means including conduit means fixedly attached to said other stationary member and to an external source of coolant.

3. The magnetic particle device defined in claim 1 including bearing means for rotatably supporting the movable member, said bearing means being located in axial spaced relationship relative to the flux path on one side of the device, and means formed on said movable member for circulating air adjacent to the movable and stationary members during rotation thereof.

4. The magnetic particle device defined in claim 1 wherein the non-magnetic connecting means include an annular band of a non-magnetic substance.

5. The magnetic particle device defined in claim 4 wherein the pair of spaced annular portions of the movable member include annular portions each having a predetermined thickness and a sidewardly extending flange, the flanges on said portions extending toward each other being separated by the band of non-magnetic substance.

6. A magnetic particle brake comprising a stationary member including a housing portion constructed of magnetic material, said housing having a central chamber defined by spaced annular magnetic members, and an annular chamber outwardly of said annular members, a coil mounted in said annular housing chamber, means connecting said coil to a source of electric energy, a pair of spaced relatively movable members one of which is fixedly attached to the stationary housing member, said relatively movable members having portions thereof positioned within the central housing chamber inwardly of the coil, said portions including closely spaced cylindrical surfaces defining an annular space therebetween, particles of a magnetic material positioned in the annular space between the relatively movable members, means forming a flux path between the spaced housing portions and the relatively movable members, one of said relatively movable members including annular spaced magnetic portions connected together by means of a non-magnetic connection substance, the spaced portions of said one relatively movable member being positioned between the respective spaced housing members and the other of said relatively movable members whereby the flux path generated by the coil when the coil is energized extends from the spaced housing portions into the respective spaced portions of said one relatively movable member on opposite sides of the non-magnetic connection substance, through the magnetic particles and into the other of said relatively movable members, the current flowing through said coil establishing coupling between the relatively movable members that varies in a direct relationship with the current flow in the coil.

7. The magnetic particle brake defined in claim 6 wherein said stationary member has a chamber therein and passage forming means to said chamber, and means connecting said passage means to a source of liquid coolant for circulating said coolant through the passage forming means and the chamber in the stationary member.

8. The magnetic particle brake defined in claim 6 including fins on both opposite ends of said one relatively movable member for circulating air during operation thereof.

9. The magnetic particle brake defined in claim 6 including journal means for rotatably supporting said one relatively movable member, said journal means being located in axial spaced relationship from the coil and the flux path produced thereby on one side of the device.

10. The magnetic particle brake defined in claim 6 including cooperating overlapping means on the respective relatively movable members to prevent escape of magnetic particles from the space therebetween.

11. The magnetic particle brake defined in claim 6 wherein the annular spaced magnetic portions of the one relatively movable member include spaced and opposed flanged edge portions some portions of which are closer together than other portions, and said non-magnetic substance uniting said magnetic portions.

12. A magnetic particle device comprising a stationary member including a housing portion constructed of magnetic material, said housing having spaced annular inner portions defining an inner housing chamber, an annular coil mounted in said housing outwardly of said spaced annular housing portions, means connecting said coil to a source of electric energy for generating flux in said housing, a pair of relatively movable members mounted in said housing, each of said relatively movable members respectively having oppositely extending shaft portions, one of which is locked against movement and the other of which is connected to an external member, the other of said relatively movable members having a tubular portion positioned extending adjacent to the inner portion of the coil housing, said tubular portion including spaced magnetic elements connected by a band of non-magnetic material positioned therebetween, said locked member having a portion positioned inwardly of the tubular portion of the other relatively movable member, said locked member having a cylindrical outer surface and the tubular portion of the other member having a cylindrical inner surface spaced closely adjacent to the said cylindrical outer surface to define an annular space therebetween, magnetic particles positioned in the annular space between the relatively movable members whereby when the coil is energized it establishes a magnetic flux path which extends between the spaced housing portions into the respective spaced portions of the other relatively movable member on opposite sides of the non-magnetic material, through the magnetic particles and into the locked member, the magnetic coupling established between said relatively movable members varying in a direct relationship with the current flowing through the coil.

13. The magnetic particle device defined in claim 12 including bearing means for rotatably supporting the other of said relatively movable members, said bearing means being located in spaced axial relationship to the coil and to the flux path generated thereby.

14. The magnetic particle device defined in claim 12 wherein said other relatively movable member has means formed on opposite ends thereof for circulating air during operation of the device.

15. The magnetic particle device defined in claim 12 including means for circulating a liquid coolant through the locked member, said coolant circulating means including chamber means formed in said locked member and conduit means fixedly connected to said locked member for communicating the chamber means to a source of liquid coolant.

16. A magnetic particle device comprising a stationary member including a housing portion constructed in part of magnetic material, said housing having an annular cavity formed at least in part by spaced annular magnetic housing portions, an annular coil mounted in said housing cavity, means connecting said coil to a source of electric energy, a movable member mounted in said stationary member including a pair of aligned annular magnetic portions connected together by a relatively more narrow magnetic connection portion of limited flux carrying capacity therebetween, said pair of magnetic portions located closely adjacent to respective ones of the spaced annular housing portions on the opposite sides thereof from the coil, another stationary magnetic member positioned on the opposite side of said pair of magnetic portions from the spaced housing portions, said other magnetic member including a portion that extends across the narrow magnetic connection portion so that a magnetic flux path produced when the coil is energized extends from the spaced housing portions through the respective pair of magnetic portions of the movable member and through the other stationary magnetic member, the flux in the narrow connecting portion saturating at a relatively low flux level, and particles of a magnetizeable substance positioned in the space between the movable member and the said other stationary member, said particles forming parts of the flux path produced when the coil is energized.

17. The magnetic particle device defined in claim 16 wherein the relatively narrow magnetic connection between the aligned annular magnetic portions of the movable member is integral therewith and is formed by an annular groove, and means for filling said groove with a relatively non-magnetic substance.

* * * * *

UNITED STATES PATENT OFFICE
CERTIFICATE OF CORRECTION

Patent No. 3,962,595                     Dated June 8, 1976

Inventor(s) Gerald R. Eddens

It is certified that error appears in the above-identified patent and that said Letters Patent are hereby corrected as shown below:

Column 4, line 46, omit "and" and substitute therefor --- the ---.

Column 7, line 7, omit "52-"" and substitute therefor --- 52'''' ---.

Column 8, line 52, after "on" insert --- each opposite end of ---.

Signed and Sealed this

Twenty-first Day of September 1976

[SEAL]

Attest:

RUTH C. MASON  
*Attesting Officer*

C. MARSHALL DANN  
*Commissioner of Patents and Trademarks*